Figure 1:
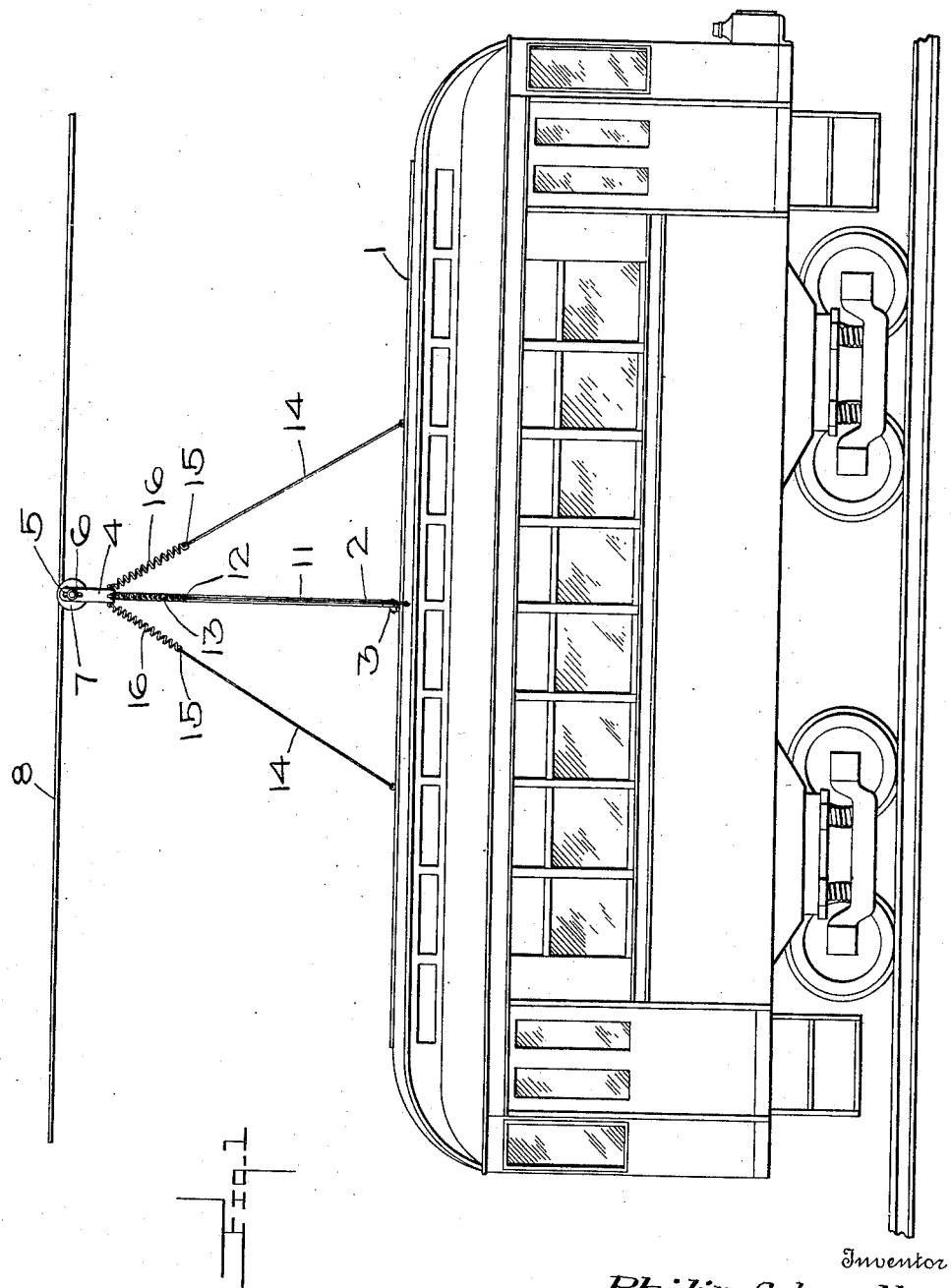

P. SCHNELL.
TROLLEY POLE.
APPLICATION FILED FEB. 11, 1910.

976,501.

Patented Nov. 22, 1910.

2 SHEETS—SHEET 1.

Witnesses
Ed. P. Lusby
C. H. Hollet.

Inventor
Philip Schnell

By Woodward & Chandlee.
Attorney

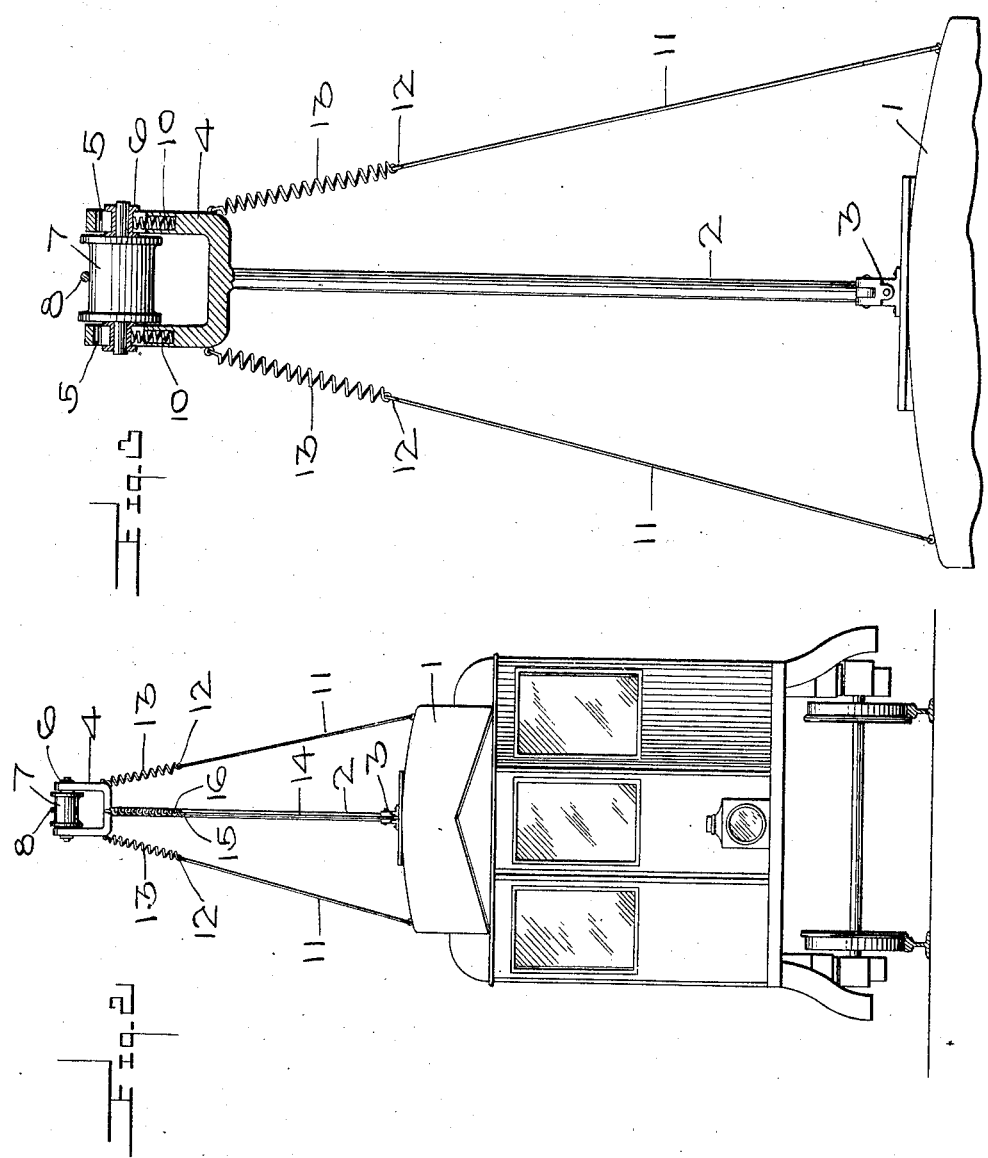

UNITED STATES PATENT OFFICE.

PHILIP SCHNELL, OF PHILADELPHIA, PENNSYLVANIA.

TROLLEY-POLE.

976,501.   Specification of Letters Patent.   Patented Nov. 22, 1910.

Application filed February 11, 1910. Serial No. 543,384.

*To all whom it may concern:*

Be it known that I, PHILIP SCHNELL, a citizen of the United States, residing at Philadelphia, in the county of Philadelphia and State of Pennsylvania, have invented certain new and useful Improvements in Trolley-Poles, of which the following is a specification.

The object of my invention is to provide a very simple, practical and efficient trolley pole, that will obviate the unnecessary delay and annoyance, and in many incidents accidents caused by the trolley or contact wheel from being accidentally displaced or removed from the trolley or electric supply wire, and passing around or traveling curves, or where the car is passing over surfaces or a rolling bed of various or uneven elevation.

My invention therefore consists of means for yieldingly supporting the trolley pole in a substantially upright or vertical position above the roof of the car, whereby the trolley or contacting device carried by the upper end of the trolley pole, is permitted to bodily move vertically, laterally and longitudinally in respect to the roof of the car while the latter is in motion.

Other objects and advantages will be apparent from the following description and it will be understood that changes in the specific structure shown and described may be made within the scope of the claim without departing from the spirit of the invention.

In the drawings: Figure 1 is a side elevation of my complete invention as applied to a car. Fig. 2 is an end view of the same. Fig. 3 is a sectional view of the upper end of the pole.

The roof of the car may be of the well known or approved design to which my invention is easily and conveniently attached.

The lower end of the trolley pole 2 is connected to the roof of the car by a suitable swivel or universal joint 3, or such a jointed connection as to permit the upper end of the pole to move in any desired position, while the car is in motion. The upper end of the pole 2 thus attached to the roof of the car is forked as shown at 4, and formed in the opposite free ends of the said fork are longitudinally arranged slots 5, which freely receive the trunnion 6 slidingly located within said slots, whereby the trolley wheel or contacting device 7 is permitted to slide within the upper forked end of the pole thus constructed in a yielding and adjustable manner in respect to the trolley 8 against which the said trolley wheel is normally in contact.

The upper opposite forked ends of the trolley pole are provided with sockets which extend below the trunnions 6 of the trolley wheel 7 within which sockets coil springs 10 are confined, the ends of which are in contact with the lower terminal walls of said socket and having their opposite ends in contact with said trunnions, it being observed that both sides of the forked ends of the trolley pole are similarly constructed. The coil springs 10 thus employed will yieldingly hold the trolley wheel 7 against the trolley or supply wire 8, the said trolley being held in its proper position in respect to the upper end of the trolley pole by the oppositely located slots 5 within which the trunnions 6 are slidingly located.

Located on the opposite sides of the trolley pole and movably secured to the roof of the car 1 at a suitable distance from the lower swiveled end of the trolley pole are two stay wires 11, the upper ends of which are provided with eyes 12 to which are attached the lower ends of the coil spring 13, the opposite ends of the latter being attached to the trolley pole about its forked end on either side of the pole proper, whereby said pole is permitted to yield laterally while the car is traveling or passing around a curve. Also attached to the roof of the car 1 and located in front and in the rear of the trolley pole 2 are movably secured the lower ends of two stay wires 14, the upper ends of the same being also provided with eyes 15, which form a movable connection for the lower ends of the coil springs 16, the latter being attached to the trolley pole about its forked ends, whereby the trolley pole is permitted to yield in a longitudinal direction in respect to the length of the car.

In carrying out my invention it is further to be observed that the trolley wheel 7 is sufficiently wide to prevent the same from jumping and said wheel allows the supply wire to cut across the contacting rolling surface of the trolley wheel in rounding curves.

By the employment of the stay wires and their yielding connection to the trolley pole, the latter is held in a substantially vertical position in respect to the roof of the car, the said springs forming a part of the stay wires permitting the pole to yield while the car is in motion, the springs 10 further compensating for any movement of the trolley wheel independently of the upper end of the trolley pole and further, causing the said trolley wheel to be normally held in a yielding contacting position with the trolley or supply wire.

What is claimed is:

A trolley pole having an upper forked end, said forked end being provided with oppositely located longitudinally arranged slots, said slots having sockets forming their terminal ends, a trolley wheel mounted in the upper forked end of said pole, trunnions projecting from the opposite sides of said trolley wheel and slidingly located within the slots formed in the forked end of the pole, coil springs located within suitable sockets formed in the terminal ends of the slot and bearing against the said trunnion, stay wires, the lower ends of which are movably secured to the roof of the car on either side of the pole, springs connecting the upper ends of said stay wires to the pole adjacent to the forked end thereof, stay wires the lower ends of which are also movably attached to the roof of the car in front and in rear of the pole and springs connecting the upper ends of the last named stay wires to the pole adjacent to the forked end thereof, whereby the pole is yieldingly held in a substantially vertical position with its trolley wheel in yielding contact with the supply wire.

In testimony whereof I affix my signature, in presence of two witnesses.

PHILIP SCHNELL.

Witnesses:
   DAVID BEATON,
   W. H. F. WARD.